(12) United States Patent
Kang et al.

(10) Patent No.: US 11,321,415 B2
(45) Date of Patent: May 3, 2022

(54) METHOD, APPARATUS AND COMPUTER PROGRAM FOR PROCESSING URL COLLECTED IN WEB SITE

(71) Applicant: NAVER CLOUD CORPORATION, Seongnam-si (KR)

(72) Inventors: Bong Goo Kang, Seongnam-si (KR); Min Seob Lee, Seongnam-si (KR); Won Tae Jang, Seongnam-si (KR); June Ahn, Seongnam-si (KR); Jihwan Yoon, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 0 days.

(21) Appl. No.: 16/829,446

(22) Filed: Mar. 25, 2020

(65) Prior Publication Data
US 2020/0311171 A1  Oct. 1, 2020

(30) Foreign Application Priority Data

Mar. 28, 2019  (KR) .......................... 10-2019-0036358

(51) Int. Cl.
  *G06F 15/16*  (2006.01)
  *G06F 16/955*  (2019.01)
  *H04L 29/06*  (2006.01)
  *H04L 67/02*  (2022.01)

(52) U.S. Cl.
  CPC .......... *G06F 16/9566* (2019.01); *H04L 63/12* (2013.01); *H04L 67/02* (2013.01)

(58) Field of Classification Search
  CPC .. G06F 16/951; G06F 16/9532; G06F 16/953; G06F 16/9535; G06F 16/9538; G06F 16/9566; H04L 63/12; H04L 67/02
  See application file for complete search history.

(56) References Cited

U.S. PATENT DOCUMENTS

| 7,680,773 | B1 * | 3/2010 | Acharya | G06F 16/951 707/737 |
| 8,799,262 | B2 * | 8/2014 | Paduroiu | G06F 16/951 707/710 |
| 9,448,999 | B2 * | 9/2016 | Lee | G06F 16/2228 |
| 9,792,370 | B2 * | 10/2017 | Ayoub | G06F 16/951 |

(Continued)

FOREIGN PATENT DOCUMENTS

| KR | 100902757 B1 | 6/2009 |
| KR | 1020150133370 A | 11/2015 |

OTHER PUBLICATIONS

Notice of allowance issued in KR patent application No. 10-2019-0036358, dated Jan. 29, 2021.

*Primary Examiner* — Cheikh T Ndiaye

(74) *Attorney, Agent, or Firm* — Greer Burns & Crain Ltd.

(57) ABSTRACT

A URL processing method includes a response data determining step in which a URL processing apparatus determines whether to exclude one or more URLs included in a first web page from a valid URL list using header information for the first web page of a first web site and a similarity based valid URL calculating step of estimating a similarity between web pages corresponding to respective URLs according to a predetermined criterion with respect to one or more URLs included in the first web page and selecting some of URLs of a similar web page calculated according to the similarity and adding the selected URLs in the valid URL list.

12 Claims, 11 Drawing Sheets

(56) References Cited

U.S. PATENT DOCUMENTS

| | | | |
|---|---|---|---|
| 2004/0205114 A1* | 10/2004 | Kinoshita | G06F 16/951 |
| | | | 709/202 |
| 2006/0122972 A1* | 6/2006 | Keohane | G06F 16/9535 |
| 2008/0086555 A1* | 4/2008 | Feinleib | G06F 16/35 |
| | | | 709/224 |
| 2008/0222140 A1* | 9/2008 | Lagad | G06F 16/951 |
| 2010/0106706 A1* | 4/2010 | Rorex | G06Q 30/0277 |
| | | | 707/709 |
| 2012/0036580 A1* | 2/2012 | Gorny | H04L 63/1433 |
| | | | 726/25 |
| 2013/0332443 A1* | 12/2013 | Opalinski | G06F 16/972 |
| | | | 707/709 |
| 2015/0341381 A1* | 11/2015 | Lee | G06F 21/566 |
| | | | 726/22 |

* cited by examiner

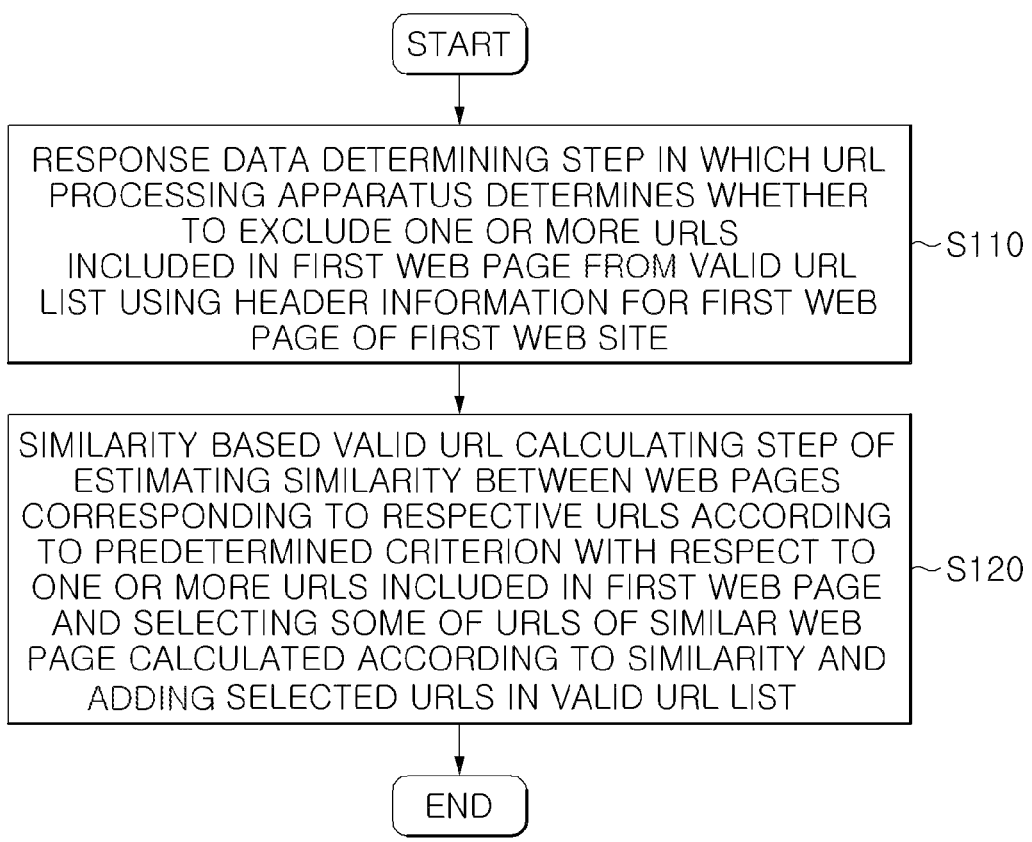

FIG. 3

```
HTTP/1.1 200 OK
Data: Wed, 27 Mar 2019 02:25:07 GMT
Server: Apache/2.4.6 (CentOS) PHP/5.4.16
X-Powered-By: PHP/5.4.16                                    ⎫
Content-Length: 6724                                        ⎬ 310
Keep-Alive: timeout=5, max=96                               ⎪
Connection: Keep-Alive                                      ⎭
Content-Tytpe: text/html; charset=UTF-8
X-XSS-Protection: 0
                    320

<!DOCTYPE HTML>
<html>

<head>
<meta http-equiv="Content-Type" content="text/html; charset=utf-8">
<title>abcd.com</title>

</head>                                                     ⎬ 330

<body>
<h1>HTML page for abcd.com</h1>
<img src=www.abcd.com/efg/abcd.jpg width=100 height=100>
</body>
                  340

</html>
```

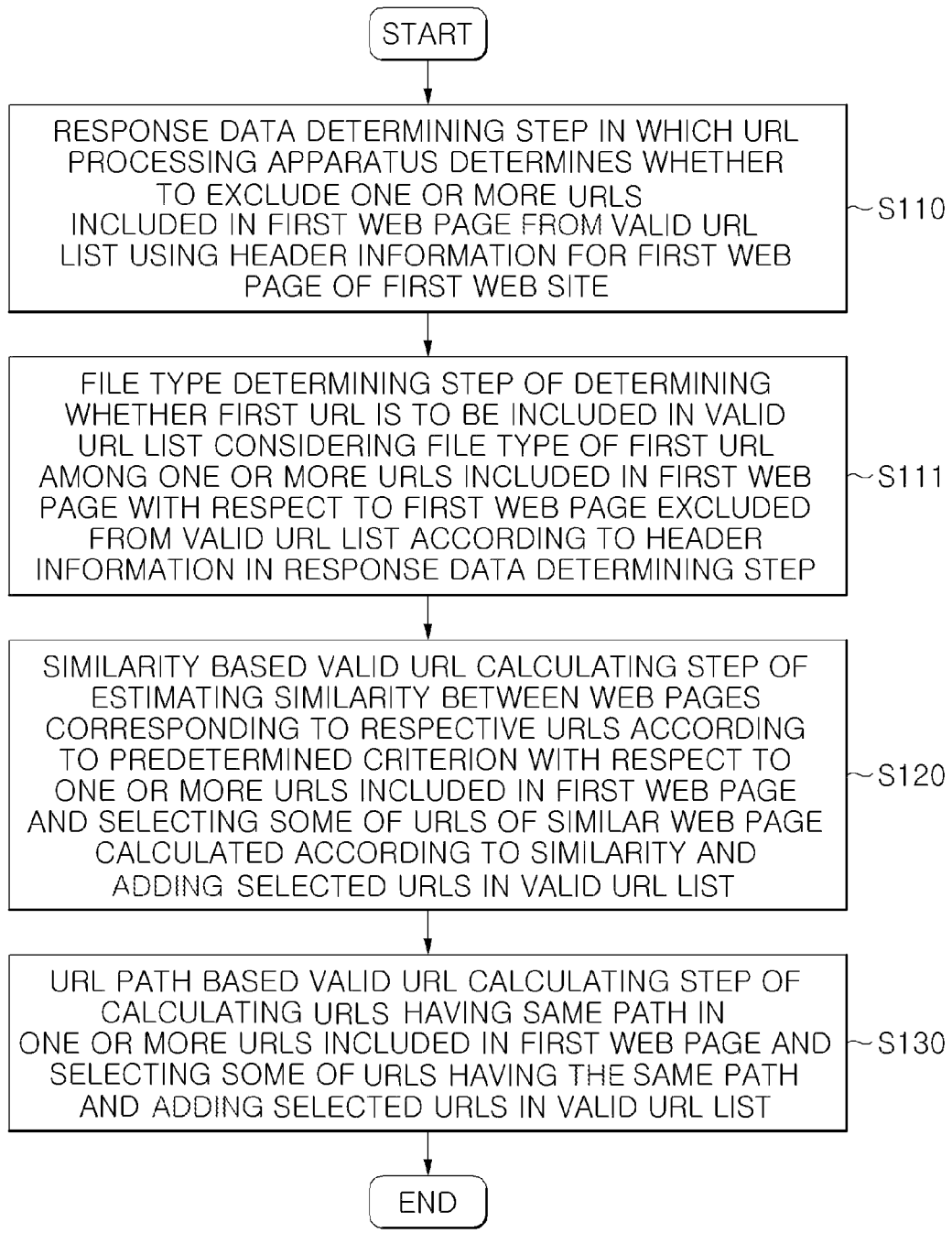

FIG. 6A http://www.abcd.com/efg/hij.html?id=1234

- 510: http://
- 520: www.abcd.com/efg/hij.html
  - 520a: www.abcd.com
  - 520b: /efg/hij.html
- 530: ?id=
- 540: 1234

FIG. 6B http://www.abcd.com/efg/klm.html?loginName=user123

- 550: http://www.abcd.com/efg/klm.html
- 560: ?loginName=
- 570: user123

FIG. 6C http://www.abcd.com/efg/klm.html?loginName=user456

- 550: http://www.abcd.com/efg/klm.html
- 560: ?loginName=
- 580: user456

METHOD, APPARATUS AND COMPUTER PROGRAM FOR PROCESSING URL COLLECTED IN WEB SITE

CROSS-REFERENCE TO RELATED APPLICATIONS

This application claims priority to Korean Patent Application No. 10-2019-0036358 filed on Mar. 28, 2019 in Korean Intellectual Property Office, the entire content of which is hereby incorporated by reference in its entirety.

BACKGROUND OF THE INVENTION

Field of Invention

The present invention relates to a method, an apparatus and a computer program for processing a URL collected in a web site, and more particularly, to a method, an apparatus and a computer program, which are capable of selecting a valid URL which can be more efficiently used rather than a valid URL which is unnecessary or duplicated among URLs collected in a web site.

Description of Related Art

With the development of information and communication technologies, users can obtain information desired thereby anywhere at any time by using various terminals such as a personal computer (PC) or a smart phone. For example, a user may access a portal site, etc., by using various wired/wireless terminals to conveniently receive various information including weather, dictionaries, concerts, travels, movies, and the like. As a result, there is a need for a document such as the web site to be searched and information collected and updated to provide various information to the user in a portal site, etc.

A process of collecting and analyzing the web sites in order to collect the information to be provided to the user is referred to as web crawling. In web crawling, various information is analyzed and collected while sequentially visiting uniform resource locators (URLs) included in the web site.

However, when a URL is collected from the web site using web crawling, there is a problem in that duplicated or useless URLs are collected. As a result, work efficiency deteriorates and unnecessary work is performed.

As a more specific example, when a plurality of URLs is intended to be collected and web vulnerability scanning for the collected URLs is intended to be performed in the web site, even though URLs for an image file are collected, which are included in the web site, usefulness of utilizing the URL for web vulnerability scanning is low. Furthermore, when a plurality of URLs having the same or similar web page style is collected, there is a problem in that only a load of a server increases while unnecessarily duplicatively performing the web vulnerability scanning.

As a result, a request for a scheme capable of obtaining refined URLs by deleting unnecessary URLs according to the purpose of use among the plurality of URLs collected from the web site is continued, but an effective solution scheme therefor has not yet been presented.

BRIEF SUMMARY OF THE INVENTION

The present invention is contrived to solve the problem in the related art and has been made in an effort to provide a method, an apparatus and a computer program for processing a URL, which can select a valid URL which can be more efficiently used rather than a URL such as a URL unnecessary for or duplicated with a purpose to be used among URLs collected in a web site.

A detailed object of the present invention will be apparently determined and appreciated by one of ordinary skill in the art through detailed contents disclosed below.

An exemplary embodiment of the present invention provides a URL processing method which includes: a response data determining step in which a URL processing apparatus determines whether to exclude one or more URLs included in a first web page from a valid URL list using header information for the first web page of a first web site; and a similarity based valid URL calculating step of estimating a similarity between web pages corresponding to respective URLs according to a predetermined criterion with respect to one or more URLs included in the first web page and selecting some of URLs of a similar web page calculated according to the similarity and adding the selected URLs in the valid URL list.

Another exemplary embodiment of the present invention provides a URL processing method which includes: a response data determining step in which a URL processing apparatus determines whether to exclude one or more URLs included in a first web page from a valid URL list using header information for the first web page of a first web site; and a URL path based valid URL calculating step of calculating URLs having the same path in one or more URLs included in the first web page and selecting some of the URLs having the same path and adding the selected URLs in the valid URL list.

Still another exemplary embodiment of the present invention provides a computer program for executing each step of the disclosed URL processing method in combination with hardware.

Yet another exemplary embodiment of the present invention provides a URL processing apparatus which includes: a response data determination unit determining whether to exclude one or more URLs included in a first web page from a valid URL list using header information for the first web page of a first web site; and a similarity based valid URL calculation unit estimating a similarity between web pages corresponding to respective URLs according to a predetermined criterion with respect to one or more URLs included in the first web page and selecting some of URLs of a similar web page calculated according to the similarity and adding the selected URLs in the valid URL list.

Still yet another exemplary embodiment of the present invention provides a URL processing apparatus which includes: a response data determination unit determining whether to exclude one or more URLs included in a first web page from a valid URL list using header information for the first web page of a first web site; and a URL path based valid URL calculation unit calculating the same path URL having the same path in one or more URLs included in the first web page and selecting some of the same path URLs and adding the selected URLs in the valid URL list.

According to an exemplary embodiment of the present invention, in a method, an apparatus and a computer program for processing a URL, a valid URL is selected depending on the purpose of use among URLs collected in a web site to more efficiently process work to be performed by using the selected valid URL.

BRIEF DESCRIPTION OF THE DRAWINGS

In order to help understanding of the present invention, the accompanying drawings which are included as a part of the Detailed Description provide embodiments of the present invention and describe the technical spirit of the present invention together with the Detailed Description.

FIG. 2 is a flowchart of a URL processing method according to an exemplary embodiment of the present invention.

FIG. 3 is a diagram for illustrating a case of calculating a valid URL according to response data and a file type in a URL processing method according to an exemplary embodiment of the present invention.

FIG. 4 is a detailed flowchart of a URL processing method according to an exemplary embodiment of the present invention.

FIGS. 6A, 6B and 6C are diagrams for illustrating a case of classifying a group according to a URL in a URL processing method according to an exemplary embodiment of the present invention.

DETAILED DESCRIPTION OF THE INVENTION

The present invention may have various modifications and various embodiments and hereinafter, specific embodiments will be described in detail based on the accompanying drawings.

In describing the present invention, a detailed description of related known technologies will be omitted if it is determined that they make the gist of the present invention unclear.

Terms including first, second, and the like are used for describing various constituent elements, but the constituent elements are not limited by the terms and the terms are used only for distinguishing one constituent element from other constituent elements.

Hereinafter, exemplary embodiments of a method, an apparatus and a computer program for processing a URL according to the present invention will be described in detail with reference to the accompanying drawings.

Figure 1:
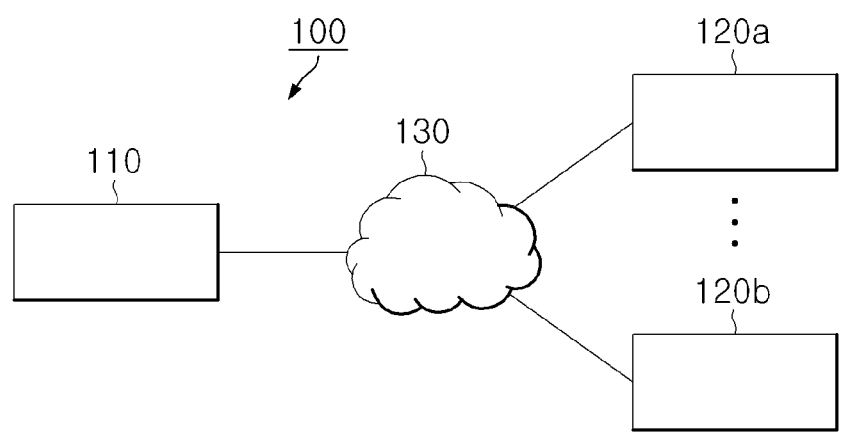
FIG. 1 is a configuration diagram of a URL processing system according to an exemplary embodiment of the present invention.

First, FIG. 1 is a configuration diagram of a URL processing system 100 according to an exemplary embodiment of the present invention. As illustrated in FIG. 1, the URL processing system 100 according to an exemplary embodiment of the present invention may be configured to include one or more web servers 120a, 120b, collectively referred to as web server 120, providing a web service to an apparatus (not shown) connected through a communication network 130 and a URL processing apparatus 110 processing one or more URLs collected in a web site served by the web server 120 and calculating a valid URL.

In this case, the URL processing apparatus 110 may be implemented using a server, either as a computer and/or computer programs, but the present invention is not particularly limited thereto and may be implemented as a separate apparatus for URL collection or furthermore, applications driven in a wired/wireless terminal such as a portable terminal such as a smartphone, a tablet PC, a PDA, a cellular phone, etc., or a personal computer (PC), etc.

The web server 120 may also be implemented using a server, but the present invention is not particularly limited thereto and may be implemented as a separate apparatus for providing a web service or furthermore, applications driven in a wired/wireless terminal such as the portable terminal such as the smartphone, the tablet PC, the PDA, the cellular phone, etc., or the personal computer (PC), etc.

The communication network 130 connecting the URL processing apparatus 110 and the web server 120 may include a wired network and a wireless network and in detail, may include various networks including a local area network (LAN), a metropolitan area network (MAN), a wide area network (WAN), and the like. Further, the communication network 130 may include known world wide web (WWW). However, the communication network 130 according to the present invention is not limited to the enumerated networks and may include a known wireless data network, a known telephone network, and a known wired/wireless television network as at least some networks.

FIG. 2 is a flowchart of a URL processing method according to an exemplary embodiment of the present invention. As illustrated in FIG. 2, the URL processing method according to an exemplary embodiment of the present invention may include a response data determining step (S110) in which a URL processing apparatus 110 determines whether to exclude one or more URLs included in a first web page from a valid URL list using header information for the first web page of a first web site, and a similarity based valid URL calculating step (S120) of estimating a similarity between web pages corresponding to respective URLs according to a predetermined criterion with respect to one or more URLs included in the first web page and selecting some of URLs of a similar web page calculated according to the similarity and adding or including the selected URLs in the valid URL list.

Hereinafter, the URL processing method according to an exemplary embodiment of the present invention will be examined in detail separately for each step with reference to FIG. 2.

First, in the response data determining step (S110), the URL processing apparatus 110 determines whether to exclude one or more URLs included in the first web page from a valid URL list using header information for the first web page of the first web site.

In this case, the URL processing apparatus 110 collects one or more URLs included in the first web page by accessing a web server 120a using a predetermined URL (e.g., seed URL) or collects one or more URLs included in the first web page by accessing another web server 120b using the URL collected in the web site of the web server 120a which was previously accessed and processes the collected URLs to calculate a valid URL.

However, the present invention is not particularly limited thereto and the URL processing apparatus 110 may process the collected URLs in real time and processes the URLs previously collected by the URL processing apparatus 110 or another apparatus afterward to calculate the valid URL.

More specifically, in the response data determining step (S110), one or more URLs included in the first web page are processed using the header information for the first web page of the first web site.

In other words, as illustrated in FIG. 3, when the URL processing apparatus 110 visits the first web site of the web server 120a, the web server 120a transmits to the URL processing apparatus 110 response data including header information 310 and body information 330 of the first web page.

In this case, as illustrated in FIG. 3, when a content-type corresponds to a predefined first list according to the purpose of use or a use purpose in the header information 310 of the first web page, the URL processing apparatus 110 processes one or more URLs included in the first web page not to be excluded from the valid URL list.

As a more specific example, when the URL processing apparatus 110 intends to select the valid URL suitable for a purpose of web vulnerability scanning among the collected URLs, the URL processing apparatus 110 may exclude the URL included in the first web page from the valid URL list when a content type of the first web page does not correspond to text, html, xml, javascript, etc., which may be used for the web vulnerability scanning according to the use purpose (web vulnerability scanning) of the URL.

As a result, in the present invention, when the URL is intended to be used for the web vulnerability scanning, the first list is determined as "application/js, text/html, text/plain, text/script, application/javascript, text/xml, application/xml, application/xhtml+xml, application/j son" and when the content type in the header information 310 of the first web page does not correspond to the first list predefined according to the use purpose, one or more URLs included in the first web page are excluded from the valid URL list.

As a more specific example, in FIG. 3, since the content type of the header information 310 is "text/html" 320 in FIG. 3, the URLs included in the web page may be included in the valid URL list.

However, the present invention is not particularly limited to the case of the web vulnerability scanning and the first list may be variously determined according to various other purposes.

Even when the content type in the header information 310 of the first web page corresponds to the first list predefined according to the use purpose, it may be determined whether the first URL is to be included in the valid URL list considering the file type of the first URL included in the first web page.

In other words, even though the content type in the header information 310 of the first web page corresponds to the first list predefined according to the use purpose (e.g., when the content type of the first web page which is used for the web vulnerability scanning corresponds to text/html 320), if the file type of the first URL included in the first web page corresponds to a second list predefined according to the use purpose (e.g., if the first URL relates to an image (jpg) file 340 and the second list includes an image (jpg) file type), the first URL may be excluded from the valid URL list.

As a more specific example, when the URL is intended to be used for the web vulnerability scanning, the second list may be determined as "(image) mng, pct, bmp, gif, jpg, jpeg, png, pst, tif, tiff, ai, drw, dxf, eps, ps, svg, (audio) mp3, wma, ogg, way, ra, aac, mid, au, aiff, (video) 3gp, asf, asx, avi, mov, mp4, mpg, qt, rm, swf, wmv, m4a, (font) woff, woff2, eot, ttf, (other) css, pdf, doc, exe, bin, rss, zip, rar" and when the first URL of the first web page corresponds to the second list, one or more URLs included in the first web page may be excluded from the valid URL list.

In the URL processing method according to an exemplary embodiment of the present invention, as illustrated in FIG. 4, the response data determining step (S110) may further include a file type determining step (S111) of determining whether the first URL is to be included in the valid URL list considering the file type of the first URL among one or more URLs included in the first web page which was excluded from the valid URL list according to the header information.

In other words, as a more specific example, even when content information in header information of the first web page is not included in a predetermined first list, and as a result, the first web page is excluded from the valid URL list in the response data determining step (S110), if the first URL is determined as the valid URL when the file type of the first URL is compared with a predetermined second list by additionally examining the file types of the first URLs included in the first web page, the first URL may be included in the valid URL list.

As such, it is determined whether the URL included in the first web page is to be excluded from the valid URL list according to the content type of the first web page and furthermore, the file type of the first URL is included in the valid URL list by considering even the file type of the first URL included in the first web page to more effectively generate the valid URL list according to the use purpose of the URL.

Next, in the similarity based valid URL calculating step (S120), the similarity between the web pages corresponding to the respective URLs is estimated according to a predetermined criterion with respect to one or more URLs included in the first web page and some of URLs of a similar web page calculated according to the similarity are selected and included in the valid URL list.

In this case, the similarity of styles of respective web pages may be digitized and calculated based on a tag included in the web page in calculating the similarity of the web page.

As a result, in the similarity based valid URL calculating step (S120), a plurality of URLs for the web page having the similar style may be prevented from being duplicatively included in the valid URL list.

Figure 5:
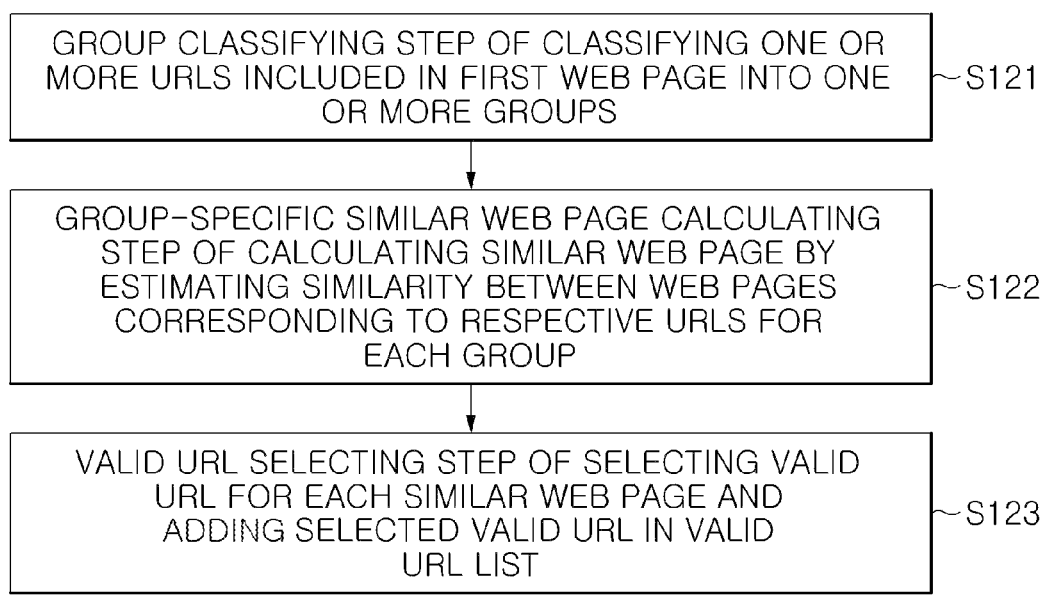
FIG. 5 is a diagram showing a detailed flowchart of a similarity based valid URL calculating step (S120) in a URL processing method according to an exemplary embodiment of the present invention.

More specifically, as illustrated in FIG. 5, the similarity based valid URL calculating step (S120) may include a group classifying step (S121) of classifying one or more URLs included in the first web page into one or more groups, a group-specific similar web page calculating step (S122) of calculating the similar web page by estimating the similarity between the web pages of the respective URLs for each group, and a valid URL selecting step (S123) of selecting the valid URL for each similar web page and adding the selected valid URL in the valid URL list.

Hereinafter, the similarity based valid URL calculating step (S120) will be described in more detail with reference to FIG. 5.

First, in the group classifying step (S121), one or more URLs included in the first web page are classified into one or more groups.

More specifically, as illustrated in FIG. 6A, a URL may include a protocol type 510, path-page information 520 except for a parameter part, a parameter variable name 530, and a variable value 540 and additionally include a method, POST data, and the like.

In this case, in the present invention, in the path-page information 520 in which the parameter part is excluded from the URL, a part before a last slash (/) is defined as path information 520*a* and a part after the last slash is defined as path information 520*b*. Further, the method included in the parameter part of the URL is referred to as method information and the POST data is referred to as POST data information.

In this case, since the path-page information 520, included in the URL and the parameter variable name information 530, and the method information, the post data information, etc., as information transferred to the web page corresponding to the URL have a significant association with the style of the web page, the group is generated by classifying the URLs based on at least one of the path-page information, the parameter variable name information, the method information, and the POST data information included in the URL and then the similar web page is calculated by estimating the similarity between the web pages for each classified group in the URL processing method according to an exemplary embodiment of the present invention.

In the URL processing method according to an exemplary embodiment of the present invention, plural information among the path-page information, the parameter variable name information, the method information, and the POST data information are sequentially applied according to the above order to classify the URLs into the groups.

More specifically, since the path-page information 520 of FIG. 6A is different from path-page information 550 of FIGS. 6B and 6C, the URL of FIG. 6A is not classified into the same group as the URLs of FIGS. 6B and 6C.

On the contrary, since the path-page information 550 of FIG. 6B is the same as the path-page information 550 of FIG. 6C, and the parameter variable name information 560 of FIG. 6B is also the same as the parameter variable name information 560 of FIG. 6C, the URLs of FIGS. 6B and 6C may be classified into the same group. (Since the parameter variable value 570 of FIG. 6B is different from the parameter variable value 580 of FIG. 6C, but the parameter variable value has a low association with the style of the web page, whether the parameter variable value 570 is the same as the parameter variable value 580 is not considered.)

Next, in the group-specific similar web page calculating step (S122), the similarity between the web pages corresponding to the respective URLs is estimated for each group to calculate the similar web page.

More specifically, in the group-specific similar web page calculating step (S122), the similarity between the web pages may be estimated based on the tag of the web page corresponding to each URL included in each group.

In the URL processing method according to an exemplary embodiment of the present invention, the similarity between the web pages may be estimated based on a <class> tag which exerts a large influence on the style of the web page. Alternatively, when there is no <class> tag in the web page, the similarity may be checked only with another tag.

In this case, the similarity between a first web page and a second web page may be estimated by [Equation 1] below.

Total tag number (total)=the number of tags of the first web page+the number of tags of the second web page Number of matched tags (matches)=the number of tags which are matched in the first web page and the second web page Similarity (similar)=2.0×matches/total [Equation 1]

In the URL processing method according to an exemplary embodiment of the present invention, the <class> tag included in the web page corresponding to each URL and the similarity by the remaining tags are considered and a higher weight than the remaining tags is assigned to the <class> tag to calculate the similar web page.

In this case, the similarity between the first web page and the second web page may be estimated by [Equation 2] (the similarity of the <class> tag), [Equation 3] (the similarity of all tags), and [Equation 4] (weight reflected similarity) below (e.g., when the weight is assigned to the <class> tag with importance of 70% of 100%).

$A$=set having the <class> tag of the first web page $B$=set having the <class> tag of the second web page Style similarity (style_similar)=$|A \cap B|/|A \cup B|$ [Equation 2]

Total tag number (total)=the number of tags of the first web page+the number of tags of the second web page Number of matched tags (matches)=the number of tags which are matched in the first web page and the second web page Tag similarity (tag_similar)=2.0×matches/total [Equation 3]

Weighted similarity (weighted_similar)=style similarity (style_similar)×first weight (0.7)+tag similarity (tag_similar)×second weight (0.3) [Equation 4]

Next, in the valid URL selecting step (S123), a valid URL is selected for each similar web page and included in the valid URL list.

As a result, in the similarity based valid URL calculating step (S120), the similarity between the web pages corresponding to the respective URLs is estimated with respect to a plurality of URLs included in the first web page and some of URLs of a similar web page calculated according to the similarity are selected and included in the valid URL list to effectively prevent the URL for the web page having the similar style from being duplicatively included in the valid URL list.

In the URL processing method according to an exemplary embodiment of the present invention, in the similarity based valid URL calculating step (S120), the similarity between the web pages corresponding to the respective URLs may be estimated according to a predetermined criterion with respect to one or more URLs included in the plurality of web pages which are included in the first web page, and some of URLs of the similar web page calculated according to the similarity may be selected and included in the valid URL list.

As a result, in the URL processing method according to an exemplary embodiment of the present invention, the similarity may be estimated even with respect to a plurality of web pages included in the same web site in addition to one web page and some of the URLs of the similar web page may be selected and included in the valid URL list.

The URL processing method according to an exemplary embodiment of the present invention may further include a URL path based valid URL calculating step (S130) of calculating URLs having the same path in one or more URLs included in the first web page and selecting some of the URLs having the same path and adding some URLs in the valid URL list as illustrated in FIG. 4.

As a result, in the URL path based valid URL calculating step (S130), the URLs having the same path are calculated in one or more URLs included in the first web page, and some of the URLs having the same path are selected and included in the valid URL list.

Figure 7A:
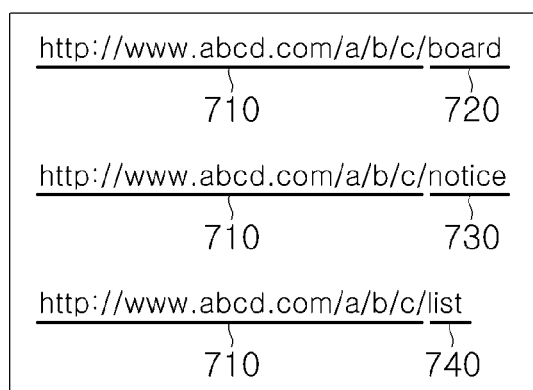
FIGS. 7A and 7B are diagrams for illustrating a URL path based valid URL calculating step (S130) in a URL processing method according to an exemplary embodiment of the present invention.

As a more specific example, FIG. 7A illustrates URLs having the same path. As illustrated in FIG. 7A, it can be seen that all URL path information 710 of respective URLs is the same, however, only page information 720, 730, 740 is different.

Figure 7B:
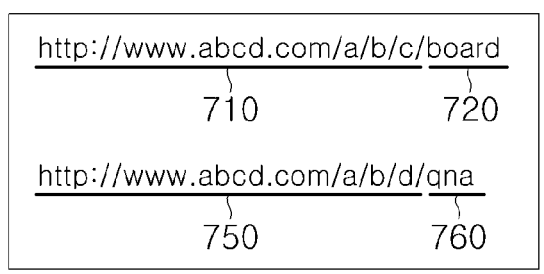

In contrast, in FIG. 7B, URLs having different path information 710, 750 are exemplified.

As such, in the URL path based valid URL calculating step (S130), a case where the URLs included in the first web page having the same path are counted, and when the URLs having the same path exceed a predetermined criterion value (e.g., 100), there is a high possibility that the web pages having the same path will have the same similar style, and as a result, one of the URLs having the same path is selected and included in the valid URL list (e.g., in FIG. 7A, only www.abcd.com/a/b/c/board is included in the valid URL list) to prevent the URLs of the web page having the same or similar style from being duplicatively included in the valid URL list.

Figure 8:
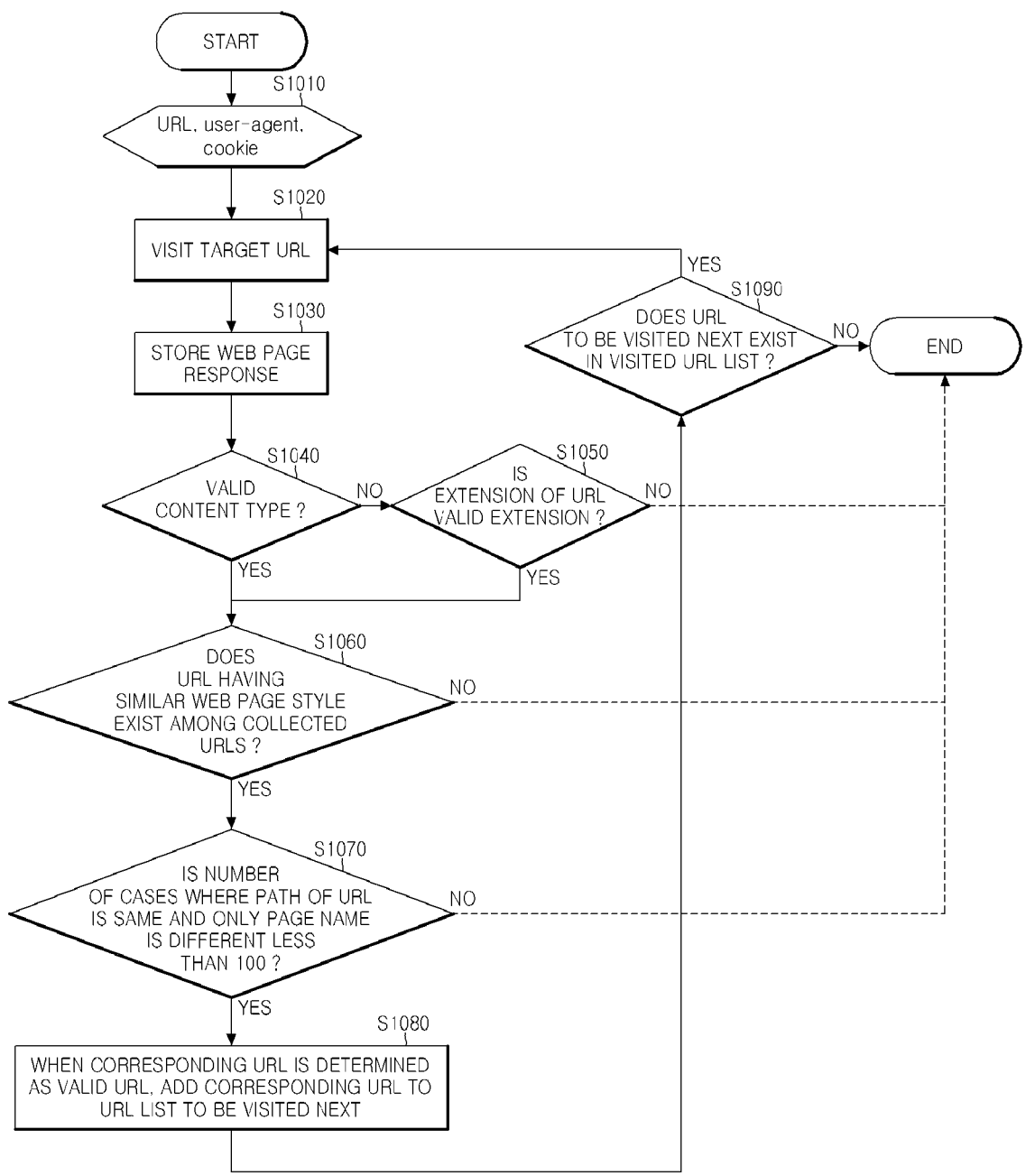
FIG. 8 is a detailed flowchart of a URL processing method according to an exemplary embodiment of the present invention.

Hereinafter, the URL processing method according to an exemplary embodiment of the present invention will be examined in more detail with reference to FIG. 8.

First, in step S1010, the URL processing apparatus 110 performs a preparation for accessing the first web site. As a result, the URL processing apparatus 110 may set a user environment for an access. As a result, the URL to be accessed may be set, user-agent may be set considering a type of web browser or a user environment or cookie may be set for setting login information such as manager setting.

Next, in step S1020, the web server 120 is accessed using the URL.

Next, in step S1030, the URL processing apparatus 110 collects and stores response data of the first web page from the web server 120.

Next, in step S1040, it is checked whether the content type of the header information in the response data of the first web page is a valid type.

In this case, when the content type of the first web page is valid, the process proceeds to step S1060 to examine whether there are URLs having similar web pages among the URLs collected in the first web page.

In step S1040, when the content type of the first web page is not valid, the process proceeds to step S1050 and a URL having an extension corresponding to a valid file type among the URLs included in the first web page is collected, and as a result, the process proceeds to step S1060.

Next, in step S1070, a case where the URLs collected in the first web page have the same path information and only different page information is counted, and when a counted number is larger than a predetermined number (e.g., 100), the first web page is determined as a duplicated page.

As a result, in step S1080, URLs determined as the valid URL are added to the valid URL list through a series of steps described above.

Last, subsequently in step S1090, it is checked whether a URL to be additionally visited is present in the first web page, and the series of steps described above is repeated if an additional URL exists, or when there is no additional URL to be visited, the operation ends.

Figure 9:
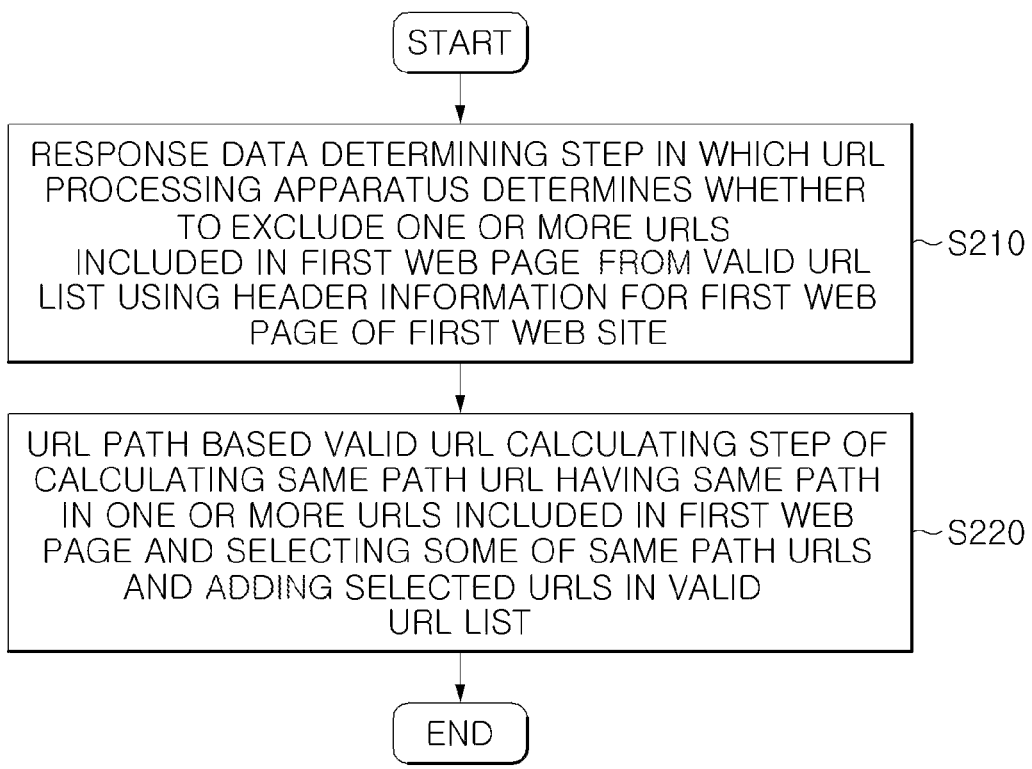
FIG. 9 is a flowchart of a URL processing method according to another exemplary embodiment of the present invention.

As illustrated in FIG. 9, the URL processing method according to an exemplary embodiment of the present invention may include the response data determining step S110 in which a URL processing apparatus (S110) determines whether to exclude one or more URLs included in a first web page from a valid URL list using header information for the first web page of a first web site, and a URL path based valid URL calculating step (S130) of calculating URLs having the same path in one or more URLs included in the first web page, and selecting some of the URLs having the same path and adding the selected URLs in the valid URL list.

In this case, in the URL processing method according to an exemplary embodiment of the present invention, the response data determining step (S110) may further include a file type determining step (S111) of determining whether the first URL is to be included in the valid URL list considering the file type of the first URL among one or more URLs included in the first web page with respect to the first web page excluded from the valid URL list according to the header information.

The URL processing method according to an exemplary embodiment of the present invention, as illustrated in FIG. 9 may be implemented as various exemplary embodiments similarly to the URL processing methods of FIGS. 2 to 8 specifically described above, and as a result, repeating a detailed description is omitted.

According to another aspect of the present invention, a computer program executes each step of the URL processing method described above in combination with a processor. The computer program may include a machine language code created by a compiler and a high-level language code which may be executed in a computer using an interpreter. In this case, the computer is not limited to a personal computer (PC) or a notebook computer and includes all information processing apparatuses which include a central processing unit (CPU) to execute the computer program, such as a server, a smartphone, a tablet PC, a PDA, a cellular phone etc. Further, the computer program may be stored in a computer readable recording medium and the medium includes all computer readable storage media such as an electronic recording medium (e.g., ROM, flash memory, etc.), a magnetic storage medium (e.g., a floppy disk, a hard disk, etc.), an optical reading medium (e.g., CD-ROM, DVD, etc.), and a carrier wave (e.g., transmission through the Internet).

Figure 10:
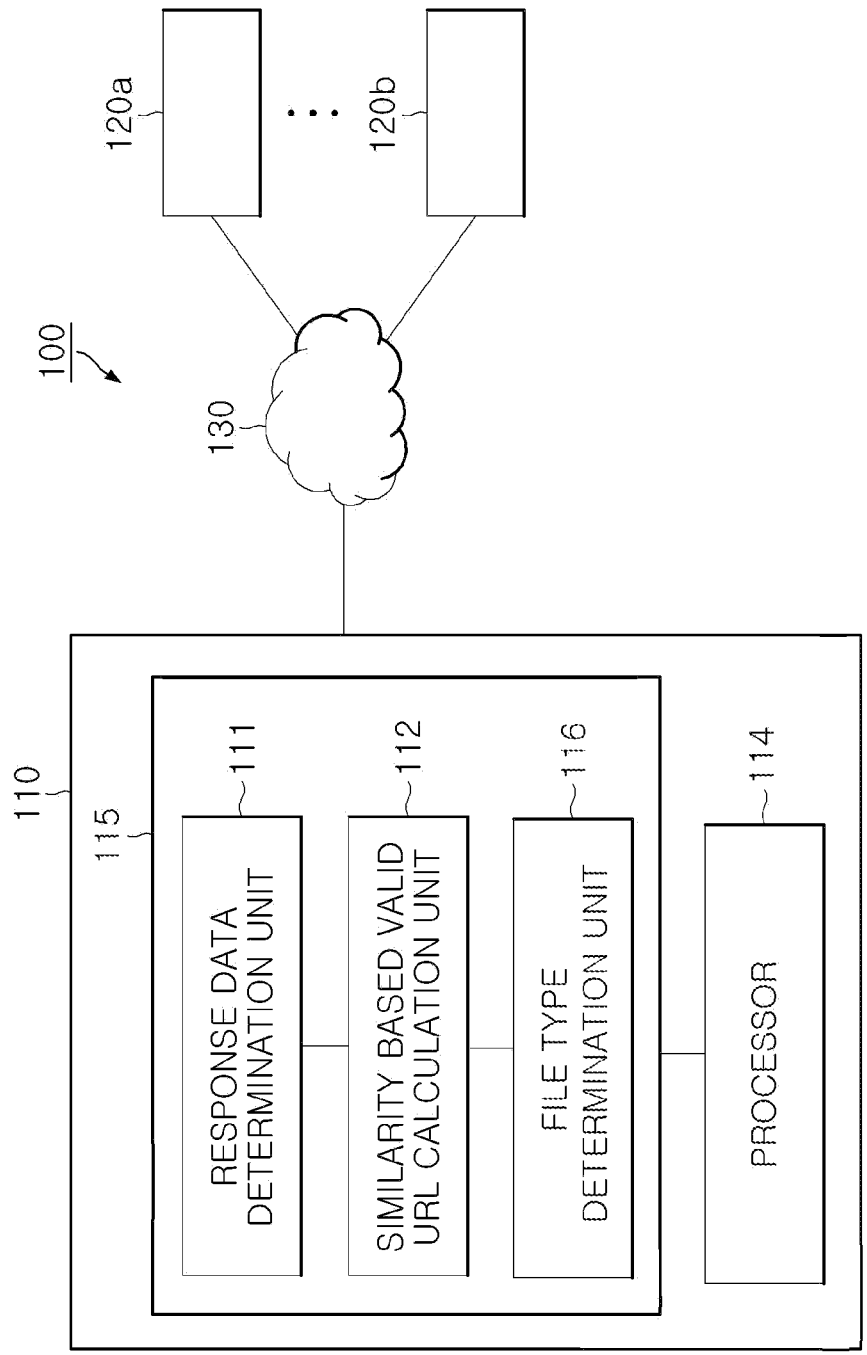
FIGS. 10 and 11 are configuration diagrams of a URL processing apparatus according to an exemplary embodiment of the present invention.

FIG. 10 is a configuration diagram of the URL processing apparatus 110 according to an exemplary embodiment of the present invention.

As illustrated in FIG. 10, the URL processing apparatus 110 according to an exemplary embodiment of the present invention may be configured to include a response data determination unit 111 and a similarity based valid URL calculation unit 112.

The URL processing apparatus 110 according to an exemplary embodiment of the present invention may include physical components including a processor 114, a memory 115, and the like and the memory 115 may include one or more modules or units configured to be executed by the processor 114. Specifically, one or more modules or units may include the response data determination unit 111 and the similarity based valid URL calculation unit 112, which may be software programs, computer codes, instructions, etc.

The processor 114 may perform various functions and perform a function of processing data by executing various software programs, computer codes and a set of commands stored in the memory 115. A peripheral interface unit (not shown) may connect an input/output peripheral device of the URL processing apparatus 110 to the processor 114 and the memory 115, and when a component of the processor 114 or the URL processing apparatus 110 accesses the memory 115, a memory controller (not shown) may perform a function of controlling a memory access. In some exemplary embodiments, the processor 114, the memory controller, and the peripheral interface unit may be implemented on a single chip or implemented as separate chips.

The memory 115 may include a high-speed random access memory, one or more magnetic disk storage devices, a non-volatile memory such as a flash memory device, and the like. Further, the memory 115 may further include a storage device located away from the processor 114 or a network attached storage device accessed through a communication network such as the Internet.

Hereinafter, the URL processing apparatus 110 according to an exemplary embodiment of the present invention will be described separately for each component. More detailed contents for the URL processing apparatus 110 according to an exemplary embodiment of the present invention may be implemented as various exemplary embodiments similarly to the URL processing method according to an exemplary embodiment of the present invention of FIGS. 2 to 8 described above, and repeating a detailed description is omitted.

First, the response data determination unit 111, when executed by the processor 114, determines whether exclude one or more URLs included in the first web page from the valid URL list using header information for the first web page of the first web site.

As a result, the similarity based valid URL calculation unit 112, when executed by the processor 114, estimates the similarity between the web pages corresponding to the respective URLs according to a predetermined criterion with respect to one or more URLs included in the first web page and selects some of the URLs of a similar web page calculated according to the similarity and adds the selected URLs in the valid URL list.

The URL processing apparatus 110 according to an exemplary embodiment of the present invention may further include a file type determination unit 116 for determining whether the first URL is to be included in the valid URL list, considering the file type of the first URL among one or more URLs included in the first web page with respect to the first web page excluded from the valid URL list according to the header information the response data determining step.

The response data determination unit 111, when executed by the processor 114, may process one or more URLs included in the first web page not to be excluded from the valid URL list when the content type in the header information corresponds to a first list predefined according to the use purpose.

The file type determination unit 116, when executed by the processor 114, determines whether the first URL is to be included in the valid URL list by comparing the file type of the first URL with a second list predefined according to the use purpose.

The similarity based valid URL calculation unit 112 may include a group classification unit (not illustrated) classifying one or more URLs included in the first web page into one or more groups, a group-specific similarity web page calculation unit (not illustrated) calculating the similar web page by estimating the similarity between the web pages of the respective URLs for each group, and a valid URL selection unit (not illustrated) selecting the valid URL for each similar web page and adding the selected valid URL in the valid URL list.

In this case, the group classification unit may classify the groups based on at least one of the path-page information except for the parameter part from the URL, the parameter variable name information, the method information, and the POST data information with respect to one or more URLs included in the first web page.

The group classification unit sequentially applies plural information among the path-page information, the parameter variable name information, the method information, and the POST data information according to the above order to classify the URLs into the groups.

The group-specific similar web page calculation unit may estimate the similarity between the web pages based on the tag of the web page corresponding to each URL.

In this case, the group-specific similar web page calculation unit considers the <class> tag included in the web page corresponding to each URL and the similarity by the remaining tags and assigns a higher weight than the remaining tags to the <class> tag to calculate the similar web page.

The similarity based valid URL calculation unit 112, when executed by the processor 114, may estimate the similarity between the web pages corresponding to the respective URLs according to a predetermined criterion with respect to one or more URLs included in a plurality of web pages with respect to the plurality of web pages of the first web page, and select some of URLs of a similar web page calculated according to the similarity and add the selected URLs in the valid URL list.

Figure 11:
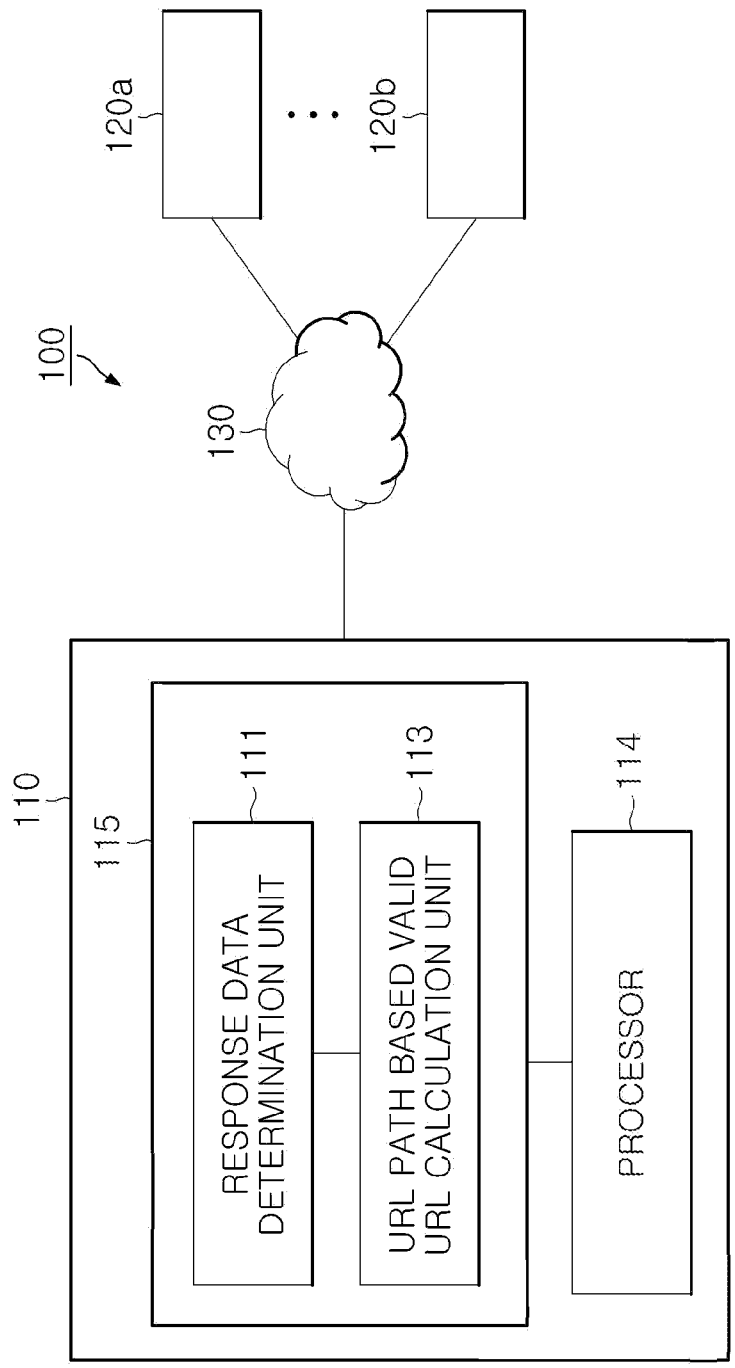

FIG. 11 is a configuration diagram of a URL processing apparatus 110 according to another exemplary embodiment of the present invention.

As illustrated in FIG. 11, the URL processing apparatus 110 according to an exemplary embodiment of the present invention may be configured to include the response data determination unit 111 and a URL path based valid URL calculation unit 113, which may be in the form of a software program, computer codes, instructions, etc The URL path based valid URL calculation unit 113, when executed by the processor, calculates URLs having the same path in one or more URLs included in the first web page, selects some of the URLs having the same path and adds some of the URLs in the valid URL list.

The URL processing apparatus 110 shown in FIG. 11 according to an exemplary embodiment of the present invention may further include the file type determination unit 116 shown in FIG. 10 for determining whether the first URL is to be included in the valid URL list considering the file type of the first URL among one or more URLs included in the first web page with respect to the first web page excluded from the valid URL list according to the header information in the response data determining step.

The URL processing apparatus 110 according to an exemplary embodiment of the present invention, which is illustrated in FIG. 11 may be implemented as various exemplary embodiments similarly to the URL processing methods of FIGS. 2 to 10, and the URL processing apparatus 110 described above in detail may be implemented as various exemplary embodiments, and as a result, repeating a detailed description is omitted.

As a result, according to an exemplary embodiment of the present invention, in a method, an apparatus and a computer program for processing a URL, a valid URL depending on the use purpose is selected other than an invalid URL such as a URL unnecessary for or duplicated with a purpose to be used among URLs collected in a web site to more efficiently process work to be performed by using the selected valid URL.

The above description illustrates the technical spirit of the present invention and various changes and modifications can be made by those skilled in the art to which the present invention pertains without departing from an essential characteristic of the present invention. Accordingly, the exemplary embodiments disclosed in the present invention are not intended to limit the technical spirit of the present invention but describe the technical spirit of the present invention and the present invention is not limited to the exemplary embodiments. The protection scope of the present invention should be construed based on the following appended claims and it should be appreciated that the technical spirit included within the scope equivalent to the claims belongs to the scope of the present invention.

What is claimed is:

1. A uniform resource locator (URL) processing method comprising:
   a response data determining step in which a URL processing apparatus determines whether to exclude one or more URLs included in body information of a first web page from a valid URL list based on a content type of the first web page included in header information for the first web page of a first web site;
   a file type determining step of determining whether a first URL is to be included in the valid URL list considering the file type of the first URL among the one or more URLs included in the first web page with respect to the first web page excluded from the valid URL list according to the header information in the response data determining step; and
   a similarity based valid URL calculating step of estimating a similarity between web pages corresponding to respective URLs according to a predetermined criterion with respect to the one or more URLs included in the first web page and selecting some of URLs of similar web pages calculated according to the similarity and adding the selected URLs in the valid URL list.

2. The URL processing method of claim 1, further comprising:
   a URL path based valid URL calculating step of calculating URLs having a same path in the one or more URLs included in the first web page, selecting some of the same path URLs and adding the selected URLs in the valid URL list.

3. The URL processing method of claim 1, wherein in the response data determining step, the one or more URLs included in the first web page are processed not to be excluded from the valid URL list when the content type in the header information corresponds to a first list predefined according to a purpose of use.

4. The URL processing method of claim 1, wherein in the similarity based valid URL calculating step, with respect to a plurality of web pages of the first web site, a similarity between web pages corresponding to respective URLs according to a predetermined criterion is estimated with respect to one or more URLs included in the plurality of web pages and URLs of similar web pages calculated according to the similarity are selected and included in the valid URL list.

5. A non-transitory computer readable recording medium storing a computer program for executing the steps of the URL processing method described in claim 1 in combination with hardware.

6. The URL processing method of claim 1, wherein in the file type determining step, whether the first URL is to be included in the valid URL list is determined by comparing the file type of the first URL with a second list predefined according to the use purpose.

7. A uniform resource locator (URL) processing method comprising:
   a response data determining step in which a URL processing apparatus determines whether to exclude one or more URLs included in body information of a first web page from a valid URL list based on a content type of the first web page included in header information for the first web page of a first web site; and
   a similarity based valid URL calculating step of estimating a similarity between web pages corresponding to respective URLs according to a predetermined criterion with respect to the one or more URLs included in the first web page and selecting some of URLs of similar web pages calculated according to the similarity and adding the selected URLs in the valid URL list,
   wherein the similarity based valid URL calculating step includes
   a group classifying step of classifying the one or more URLs included in the first web page into one or more groups,
   a group-specific similar web page calculating step of calculating a similar web page by estimating the similarity between web pages corresponding to respective URLs for each group, and
   a valid URL selecting step of selecting a valid URL for each similar web page and adding the selected valid URL in the valid URL list.

8. The URL processing method of claim 7, wherein in the group classifying step, the one or more groups are classified based on at least one of the path-page information except for the parameter part from the URL, the parameter variable name information, the method information, and the POST data information with respect to the one or more URLs included in the first web page.

9. The URL processing method of claim 8, wherein plural information among the path-page information, the parameter variable name information, the method information, and the POST data information is sequentially applied according to the above order to classify the URLs into the one or more groups.

10. The URL processing method of claim 7, wherein in the group-specific similar web page calculating step, the similarity between the web pages is estimated based on a tag of the web page corresponding to each URL.

11. The URL processing method of claim 10, wherein in the group-specific similar web page calculating step,
   a <class> tag included in the web page corresponding to each URL and a similarity by the remaining tags are considered, and
   a higher weight than the remaining tags is assigned to the <class> tag to calculate the similar web page.

12. A uniform resource locator (URL) processing method comprising:
   a response data determining step in which a URL processing apparatus determines whether to exclude one or more URLs included in body information of a first web page from a valid URL list based on a content type of the first web page included in header information for the first web page of a first web site;
   a file type determining step of determining whether a first URL is to be included in the valid URL list considering the file type of the first URL among the one or more URLs included in the first web page with respect to the first web pace excluded from the valid URL list according to the header information in the response data determining step; and
   a URL path based valid URL calculating step of calculating a same path URL in the one or more URLs included in the first web page and selecting some of the same path URLs and adding the selected URLs in the valid URL list.

* * * * *